United States Patent                                                               [11] 3,628,932

[72] Inventors Touru Inoue
              Nishinomiya-shi;
              Masakiyo Tachibana, Takarazuka-shi, both of Japan
[21] Appl. No. 788,966
[22] Filed Jan. 3, 1969
[45] Patented Dec. 21, 1971
[73] Assignee Nippon Sheet Glass Co., Ltd.
              Higashi-ku, Osaka, Japan
[32] Priority Jan. 10, 1968
[33]         Japan
[31]         43/1231

[54] PREPARATION OF GLASS CONTAINING SELENIUM
     5 Claims, No Drawings
[52] U.S. Cl. ............................................... 65/18, 65/134, 106/52
[51] Int. Cl. ........................................................ C03b 23/20
[50] Field of Search .............................................. 65/17, 18, 134; 106/52

[56]                References Cited
              UNITED STATES PATENTS
2,892,726   6/1959  Smith .......................... 106/52
3,291,585  12/1966  Okamura ....................... 65/18

Primary Examiner—S. Leon Bashore
Assistant Examiner—Robert L. Lindsay, Jr.
Attorney—Wenderoth, Lind & Ponack ABSTRACT: Process for preparing a molten glass containing selenium as an additive material and an alkali metal oxide as one of the essential ingredients comprising the steps of mixing the source of selenium with a portion of a raw glass batch of which the content of the alkali metal oxide in percentage by weight is 1.5–10 times as large as that of the intended molten glass, sintering the resulting mixture at a temperature between 500° and 1,000° C., then mixing the sintered product and remaining portion of the raw glass batch, wherein the content of the alkali in the remaining portion of raw glass is reduced lower than that of the intended molten glass so as to balance the mean content of the alkali metal oxide in the above sintered product and the above remaining raw glass batch to that of the intended molten glass, and melting the latter mixture in a glass melting furnace.

PREPARATION OF GLASS CONTAINING SELENIUM

This invention relates to a process for compounding raw materials for glass including selenium. To wit, the invention relates to an improvement in the preparation of glass which contains selenium.

Selenium has been used for making glasses of various utilities, such as heat-absorbing glass and colored glass, or for decolorization of glass. According to the conventional practices, in most cases the selenium in the form of metal or selenium compound is mixed and molten with other total amount of the raw materials for the glass. In such practices, the selenium tends to be volatilized during the melting step at high temperatures. Thus in the ordinary flat glass composition, less than only 10 percent of the added selenium remains in the product, the other 90 percent or more having been lost during the melting. When the amount of selenium to be added to glass batch mixture is increased in the purpose of increasing the selenium content in the glass, the loss ratio of selenium is also increased. For this reason, an excessively large amount of selenium must be added to glass batch mixture, in order to obtain a glass colored deeply with selenium. Use of expensive selenium or selenium compounds in large amount not only results in high preparation cost but also makes the atmosphere in the vicinity of a glass-melting furnace toxic.

It has now been found that the loss of selenium during sintering or melting of glass batch mixture is far less in the mixture containing greater amount of a source of alkali metal oxide, compared with the case of such mixture containing less alkali metal oxide source.

Based on this discovery, the invention provides an improved process for the preparation of selenium-containing molten glass by melting a glass batch mixture of raw materials including a source of selenium, the improvement residing in the steps of adding the source of selenium to a glass batch mixture of raw materials which leads to a glass composition of higher alkali metal oxide content then that of the intended glass composition, sintering the resulting mixture, mixing the sintered product with the balance of batch ingredients to form the intended glass composition, and melting the composition to provide the molten glass.

According to the present invention, the entire glass batch mixture of raw materials (excluding the source of selenium) is divided into two portions, and the selenium source is added to only one of the divided portions. The portion mixed with the selenium source is sintered, and then combined with the other portion of glass batch mixture, to be together melted as the last step for making the intended molten glass. It is advantageous that the ratio of the portion mixed with the selenium source to the total of raw glass materials ranges approximately one-fiftieth to one-half, preferably one-thirtieth to one-fifth. Also the portion to be mixed with the selenium source must be such a glass batch mixture as will form a glass composition of higher alkali metal oxide content then that of the intended glass composition.

Normally it is preferred that the glass batch mixture of raw materials in which the selenium source is mixed should contain an alkali metal oxide source of the amount sufficient to lead the mixture to a glass composition containing an alkali metal oxide in an amount 1.5–10 times as large as that of the alkali metal oxide in the intended glass composition. Again the preferred glass batch mixture is such that leads to a glass composition of a network former content which is less than that of the intended glass composition, but is higher than approximately half of the network former content of the intended glass composition. Most common network former includes oxides of $Si^{+4}$, $B^{+3}$, and $P^{+5}$, particularly $SiO_2$.

The glass batch mixture mixed with a selenium source and which leads to a glass composition of higher alkali metal oxide content than that of the intended glass composition, is preferably shaped to a compressed form by pelletizing or briquetting prior to the sintering treatment. This compression is effective for reducing the voids among the particles of raw materials, and consequently for improving the sintering result.

If desired, any suitable binder material such as sodium silicate, sodium phosphate, sodium hydroxide or calcium hydroxide, etc., may be added to the glass batch mixture.

The sintering temperature is variable according to the composition of glass batch mixture to be sintered, but in most cases selected from the range of approximately 500°–1,000° C. For normal flat glass composition, the sintering temperature can be selected from the range of approximately 700°–1,000° C. When the glass batch mixture to be sintered is compressed in advance, relatively low sintering temperatures can be employed. Also the glass batch mixtures containing easily melting components such as NaOH NaCl, LiCl, and $Ca(OH)_2$, can be sintered at still lower temperatures. Thus, such easily meltable components may be added to the glass batch mixtures in the purpose of making low sintering temperatures feasible.

Whereas, in one modification of the invention, the glass batch mixture to which the selenium source is added is not only sintered, but also molten at approximately 1,000° C. or at even higher temperatures.

Thus sintered, or molten, glass batch mixture containing the selenium source is subsequently combined with the remaining portion of the batch ingredients, and melted. It is preferred that the mixture is ground to have the grain size almost the same as that of the remaining batch ingredients, in advance of being combined with the remaining batch ingredients.

The following examples are given strictly in the purpose of illustrating the subject invention, but not for limiting the scope thereof. The percentages given in the examples are by weight.

EXAMPLE 1

This example illustrates the preparation of pink glass.

In order to obtain a glass composition as given in table 1 (which does not give the intended selenium content of the composition), the entire raw materials of the amounts given in the fourth column of table 2 were each divided into two portions of A and B, as indicated respectively in second and third columns of table 2. The total amount of portion A corresponds to approximately one-tenth of the entire raw materials.

Table 1

| Intended Glass Composition (%) | |
| --- | --- |
| $SiO_2$ | 72.2 |
| $Al_2O_3$ | 1.6 |
| $Fe_2O_3$ | 0.08 |
| $TiO_2$ | 0.03 |
| CaO | 7.9 |
| MgO | 4.3 |
| $Na_2O$ | 13.5 |
| Total | 99.61 |

Table 2

| Ingredient | Ingredients (kg.) Portion A | Portion B | Total |
| --- | --- | --- | --- |
| Siliceous sand | 18.9 | 233.7 | 252.6 |
| Dolomite | 8.3 | 74.7 | 83.0 |
| Sodium carbonate | 17.7 | 60.5 | 78.2 |
| Glauber's salt | | 2.9 | 2.9 |
| Aplite | 2.6 | 15.5 | 18.1 |
| Total | 47.5 | 387.3 | 434.8 |

When glass is produced from the glass batch mixture of portions A above, glass of the composition as given in table 3 below is obtained. As can be understood upon comparing table 3 with table 1, the $Na_2O$ content of the glass composition led from the glass batch mixture of portions A is 29.0 percent, which is higher than Na$_2$O content (13.5 percent) of the intended glass composition. Also the SiO$_2$ content of the former is 57.6 percent, which is less than that (72.2 percent) of the intended glass composition.

Table 3

| Glass Composition Led from Mixture of Portions A | |
| --- | --- |
| SiO$_2$ | 56.6 |
| Al$_2$O$_3$ | 1.6 |
| Fe$_2$O$_3$ | 0.07 |
| TiO$_2$ | 0.03 |
| CaO | 7.9 |
| MgO | 4.3 |
| Na$_2$O | 29.0 |
| Total | 99.5 |

To the glass batch mixture of portions A, 0.11 kg. of metal selenium was added, and the resulting mixture was granulated into the pellets of 5-12 mm. Φ using a rolling drum pelletizer. The pellets were sintered at approximately 800° C. for about 3 hours. Thus sintered product was ground to the particle size less than approximately 6 mesh (in accordance with Japanese Industrial Standard), and then mixed with the glass batch mixture of the raw materials of portions B. The resulting mixture was charged in a glass-melting furnace to be melted. The obtained glass has an absorption coefficient of 0.0657 mm.$^{-1}$ at a wavelength of 480 mμ. In general, a glass containing selenium has an absorption bond at wavelengths ranging from 400 to 500 mμ and it exhibits a maximum absorption at a wavelength of 480 mμ. Therefore, the absorption coefficient at a wavelength of 480 mμ is referred to as the coloring degree hereinafter.

b. The procedures of (a) above were repeated, except that 0.11 kg. of metal selenium was replaced by 0.05 kg. of metal selenium. The resulting flat glass was colored with the selenium, at the coloring degree of 0.0362 mm.$^{-1}$.

c. For comparison, the entire raw materials of the glass as given in the fourth column of table 2 were not divided into two portions, and mixed with 0.11 kg. of metal selenium. The resulting mixture was charged in a glass-melting furnace, melted, and formed into flat glass in the manner similar to that employed in (a). Thus obtained flat glass was colored with selenium, at the coloring degree of 0.0366 mm.$^{-1}$.

From the foregoing, it can be understood that according to the subject process, the coloring of flat glass with selenium can be achieved with the effectiveness approximately 1.8 times that of the case of using the equal amount of metal selenium in the conventional practice. It can also be understood that the coloring of the same order as can be achieved by conventional practice is achievable with approximately half the conventionally used amount of metal selenium in accordance with the subject process.

EXAMPLE 2

This example illustrates the preparation of gray glass.

In order to obtain a glass composition as indicated in table 5 (which does not give the intended selenium content of the composition), the total raw materials of the amounts shown in fourth column of table 6 were each divided into the portions A and B as respectively indicated in second and third columns of table 6. The total amount of the portion A corresponds to approximately one-twentieth of the entire raw materials.

Table 5

Intended Glass Composition (%)

| | |
| --- | --- |
| SiO$_2$ | 72.1 |
| Al$_2$O$_3$ | 1.6 |
| Fe$_2$O$_3$ | 0.21 |
| TiO$_2$ | 0.03 |
| CaO | 7.9 |
| MgO | 4.3 |
| Na$_2$O | 13.5 |
| CoO | 0.006 |
| NiO | 0.014 |
| Total | 99.66 |

Table 6

| Ingredient | Ingredients (kg.) | | |
| --- | --- | --- | --- |
| | Portion A | Portion B | Total |
| Siliceous sand | 9.4 | 243.2 | 252.6 |
| Dolomite | 4.4 | 78.6 | 83.0 |
| Sodium carbonate | 8.8 | 69.4 | 78.2 |
| Glauber's salt | | 2.9 | 2.9 |
| Aplite | | 18.1 | 18.1 |
| Red iron oxide | | 0.48 | 0.48 |
| Cobalt sulfate | | 0.08 | 0.08 |
| Nickel oxide | | 0.05 | 0.05 |
| Total | 22.60 | 412.81 | 435.41 |

The glass composition led from the glass batch mixture of above portions A is as given in table 7 below. As can be understood upon comparing table 7 with table 5, the glass led from the glass batch mixture of portions A has a higher Na$_2$O content and lower SiO$_2$ and Al$_2$O$_3$ contents, than those of the intended glass composition.

Table 7

| Glass Composition Led from Mixture of Portions A (%) | |
| --- | --- |
| SiO$_2$ | 54.3 |
| Al$_2$O$_3$ | 0.7 |
| Fe$_2$O$_3$ | 0.06 |
| TiO$_2$ | 0.02 |
| CaO | 9.0 |
| MgO | 5.0 |
| Na$_2$O | 30.4 |
| Total | 99.48 |

The glass batch mixture of portions A was mixed with 0.11 kg. of metal selenium. Subjecting the mixture to the treatments similar to those described in the run (a) of example 1, molten glass was obtained. With reference to the obtained glass, the total absorption coefficient and those due to Fe$_2$O$_3$, CoO and NiO at a wavelength of 480 mμ were measured. From these values, the absorption coefficient due to selenium alone was calculated to be 0.0725 mm.$^{-1}$.

For comparison, the same raw materials of the same amount as specified in the above were mixed with 0.11 kg. of metal selenium, without having been divided into the portions A and B. The resulting mixture was charged in a glass-melting furnace, melted, and formed into flat glass in the similar manner. The coloring degree of the product with selenium was 0.0372 mm.$^{-1}$.

What is claimed is:

1. In a method of preparing a molten glass containing selenium as an additive material and an alkali metal oxide as one of the essential ingredients from a raw glass batch, the improvement which comprises the steps of mixing a source of selenium selected from the group consisting of selenium and selenium compounds with one portion of a raw glass batch of which the content of the alkali metal oxide in percentage by weight is 1.5-10 times as large as that of the finally desired molten glass product, sintering the resulting mixture at a temperature between 500° and 1,000° C., then mixing the sintered product with another portion of the raw glass batch having an alkali metal content lower than that of the finally produced molten glass so as to produce a glass of the desired alkali metal oxide content, and melting the latter mixture in a glass-melting furnace.

2. The improvement according to claim 1, wherein the portion of the raw glass batch with which the source of selenium is to be mixed is approximately one-fiftieth to one-half by weight of the total raw glass batch.

3. The improvement according to claim 1, wherein the content of the network former of the portion of the raw glass batch with which the source of selenium is to be mixed is less than that of the finally produced molten glass and more than half of it.

4. The improvement according to claim 1, wherein the source of selenium is metal selenium.

5. In method of preparing a molten glass containing selenium as an additive material and an alkali metal oxide as one of the essential ingredients, the improvement which comprises mixing a source of selenium selected from the group consisting of selenium and selenium compounds with a raw glass batch of which the content of the alkali metal oxide in percentage by weight is 1.5–10 times as large as that of the finally desired molten glass product, melting the resulting mixture at a temperature higher than 1,000° C., then mixing the melted product with another raw glass batch, wherein the content of the alkali metal oxide is lower than that of the finally desired molten glass product so as to balance the mean content of the alkali metal oxide of the above sintered product and the other raw glass batch to that of the finally produced molten glass, and melting the latter mixture in a glass melting furnace.

* * * * *